US008817321B2

(12) United States Patent
Nagata et al.

(10) Patent No.: US 8,817,321 B2
(45) Date of Patent: Aug. 26, 2014

(54) IMAGE FORMING APPARATUS, IMAGE FORMING METHOD, AND RECORDING MEDIUM

(75) Inventors: Kenjo Nagata, Kanagawa (JP); Toru Iwanami, Kanagawa (JP); Tomohisa Suzuki, Kanagawa (JP); Makoto Hamatsu, Kanagawa (JP); Wenxiang Ge, Kanagawa (JP); Hidefumi Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 119 days.

(21) Appl. No.: 13/566,691

(22) Filed: Aug. 3, 2012

(65) Prior Publication Data

US 2013/0208288 A1 Aug. 15, 2013

(30) Foreign Application Priority Data

Feb. 15, 2012 (JP) ................................ 2012-030304

(51) Int. Cl.
*G06F 15/00* (2006.01)

(52) U.S. Cl.
USPC .......................................................... 358/1.2

(58) Field of Classification Search
USPC .......................................................... 358/1.2
See application file for complete search history.

(56) References Cited

U.S. PATENT DOCUMENTS

2005/0117926 A1 6/2005 Tanaka et al.
2013/0148134 A1* 6/2013 Une et al. ...................... 358/1.2

FOREIGN PATENT DOCUMENTS

JP 4656598 B2 3/2011

* cited by examiner

*Primary Examiner* — Saeid Ebrahimi Dehkordy
(74) *Attorney, Agent, or Firm* — Sughrue Mion, PLLC

(57) ABSTRACT

An image forming apparatus includes a controller that provides control in which, if image formation processing by a single unit is executed first since a density adjustment condition for adjusting a density of an image is satisfied, a density adjustment value is changed by a predetermined basic change amount, and a first image is formed in a corresponding image formed region with a density that is adjusted in accordance with the changed density adjustment value, and control in which, if a single image other than the first image is formed in the corresponding image formed region, the current density adjustment value is changed by a predetermined fine change amount that is smaller than the basic change amount, and the single image is formed in the corresponding image formed region with a density that is adjusted in accordance with the changed density adjustment value.

20 Claims, 12 Drawing Sheets

90

| DENSITY OF REFERENCE TONER IMAGE | $X_1$ | $X_2$ | .......... | $X_n$ |
|---|---|---|---|---|
| BASIC CHANGE AMOUNT | $A_1$ | $A_2$ | .......... | $A_n$ |

92

| DENSITY OF REFERENCE TONER IMAGE | $X_1$ | $X_2$ | .......... | $X_n$ |
|---|---|---|---|---|
| FINE CHANGE AMOUNT (FINE CHANGE COEFFICIENT) | $a_1$ | $a_2$ | .......... | $a_n$ |

IMAGE FORMING APPARATUS, IMAGE FORMING METHOD, AND RECORDING MEDIUM

CROSS-REFERENCE TO RELATED APPLICATIONS

This application is based on and claims priority under 35 USC 119 from Japanese Patent Application No. 2012-030304 filed Feb. 15, 2012.

BACKGROUND

The present invention relates to an image forming apparatus, an image forming method, and a recording medium.

SUMMARY

According to an aspect of the invention, there is provided an image forming apparatus including an image forming unit that respectively forms a plurality of images in a plurality of corresponding image formed regions by executing image formation processing by a single unit, with a density that is adjusted in accordance with a predetermined density adjustment value; and a controller that provides control in which, if the image formation processing by the single unit is executed first since a density adjustment condition for adjusting a density of an image is satisfied, the density adjustment value is changed by a predetermined basic change amount, and a first image is formed in the corresponding image formed region by the image forming unit with a density that is adjusted in accordance with the changed density adjustment value, and control in which, if a single image other than the first image is formed in the corresponding image formed region, the current density adjustment value is changed by a predetermined fine change amount that is smaller than the basic change amount, and the single image is formed in the corresponding image formed region by the image forming unit with a density that is adjusted in accordance with the changed density adjustment value.

BRIEF DESCRIPTION OF THE DRAWINGS

An exemplary embodiment of the present invention will be described in detail based on the following figures, wherein.

DETAILED DESCRIPTION

An exemplary embodiment of the present invention is described below in detail with reference to the drawings.

Figure 1:
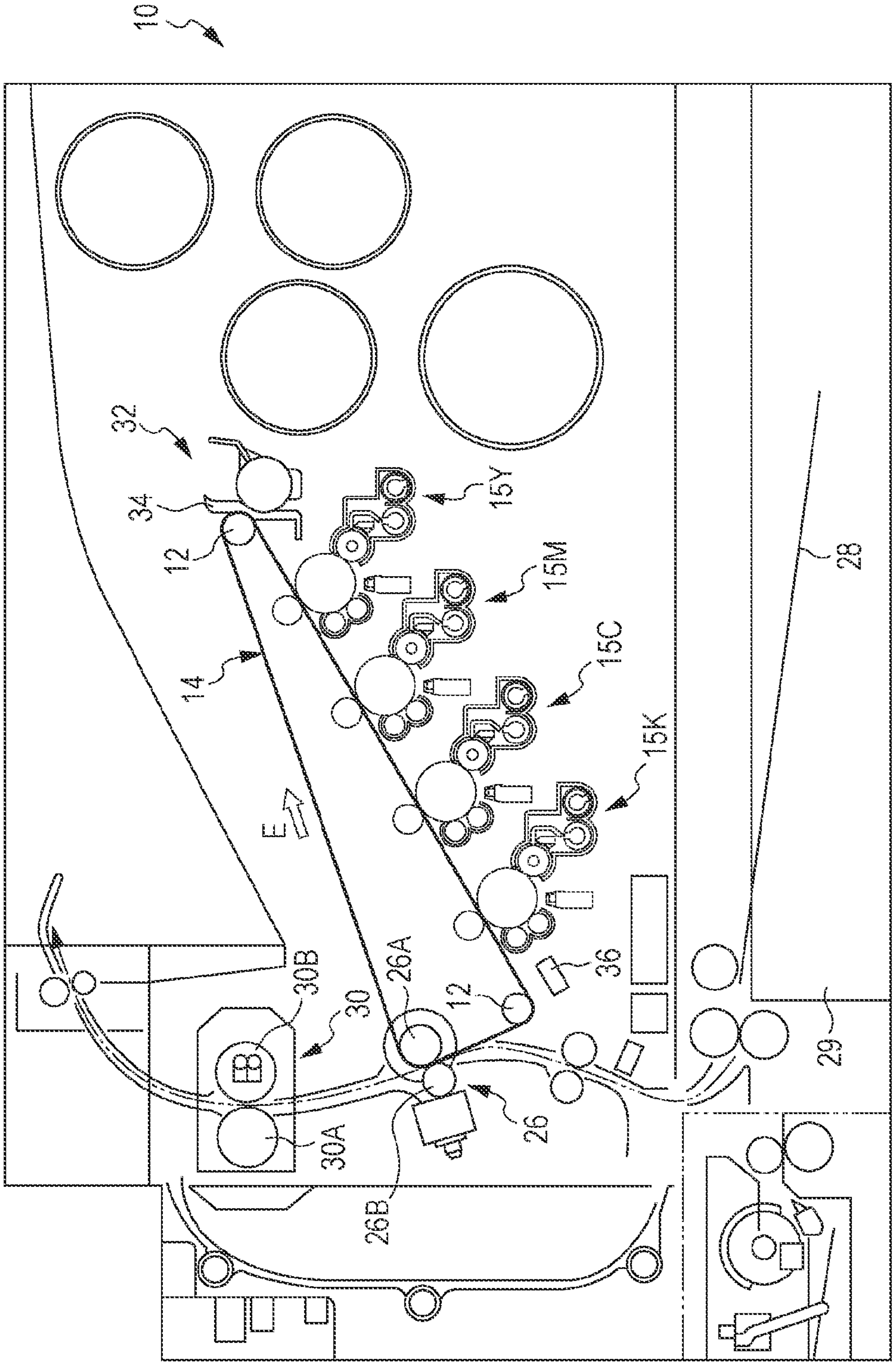
FIG. 1 is a configuration diagram showing an example of a configuration of an image forming apparatus according to an exemplary embodiment.

FIG. 1 is a brief configuration diagram showing a major configuration of an image forming apparatus 10 according to this exemplary embodiment. As shown in the drawing, the image forming apparatus 10 includes an intermediate transfer belt 14 that is an endless belt, is wound around plural rollers 12, and is transported in a direction indicated by arrow E by driving of a motor (not shown). Plural image forming units 15 are arranged along the longitudinal direction of the intermediate transfer belt 14.

The image forming apparatus 10 according to this exemplary embodiment also forms a color image, and includes image forming units 15Y, 15M, 15C, and 15K that form toner images respectively corresponding to four colors including yellow (Y), magenta (M), cyan (C), and black (K). In the following description, alphabets (Y, M, C, K) indicative of the colors are added to the ends of reference signs of members provided respectively for the colors. If such members are described without particular discrimination of the colors, the alphabets added to the ends of the reference signs are omitted.

The toner images with the mutually different colors formed by the image forming units 15 are transferred on the intermediate transfer belt 14 such that the toner images are superposed on each other on a belt surface of the intermediate transfer belt 14. Hence, a color toner image is formed on the intermediate transfer belt 14. In this exemplary embodiment, the toner image in which the four-color toner images are superposed and transferred is called final toner image.

A transfer device 26 including two facing rollers 26A and 26B is provided downstream of the four image forming units 15 in a transport direction of the intermediate transfer belt 14. The final toner image formed on the intermediate transfer belt 14 is sent to an area between the rollers 26A and 26B, and is transferred on a sheet 28 that is taken from a sheet container 29 provided in a bottom portion of the image forming apparatus 10 and that is transported to the area between the rollers 26A and 26B.

Also, a fixing device 30 including a pressure roller 30A and a heat roller 30B is provided in a transport path of the sheet 28 on which the final toner image is transferred. The sheet 28 transported to the fixing device 30 is pinched between the pressure roller 30A and the heat roller 30B and is transported. The final toner image is melted and pressed to the sheet 28. Thus, the final toner image is fixed to the sheet 28. Accordingly, a desirable image (a color image) is formed on the sheet 28. The sheet 28 with the image formed thereon is output outside the apparatus.

A cleaner 32 is provided downstream of the transfer device 26 in the transport direction of the intermediate transfer belt 14. The cleaner 32 recovers a toner that is not transferred on the sheet 28 by the transfer device 26 and remains on the intermediate transfer belt 14. The cleaner 32 is provided with a blade 34 so that the blade 34 contacts the intermediate transfer belt 14. The blade 34 recovers the toner by scraping the remaining toner.

Also, a density sensor 36 is provided downstream of the image forming units 15 in the transport direction of the intermediate transfer belt 14. The density sensor 36 radiates an image formed region on the surface of the intermediate transfer belt 14 (for example, a region predetermined as a region in which an image is formed on the surface of the intermediate transfer belt 14) with light, and detects reflection light as the result of the radiation. Hence, the density sensor 36 measures the density of a reference toner image transferred in the image formed region on the surface of the intermediate transfer belt 14.

Figure 2:
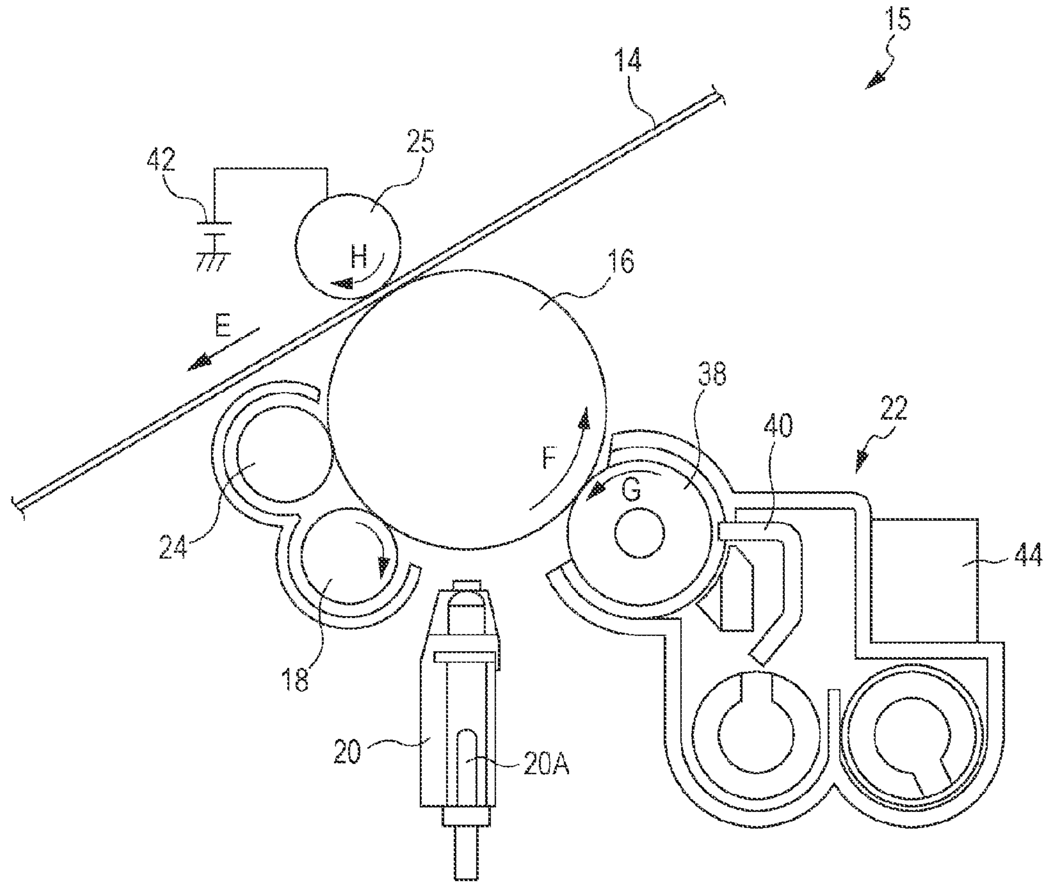
FIG. 2 is a configuration diagram showing an example of a configuration of an image forming unit according to the exemplary embodiment.

FIG. 2 illustrates a configuration of each of the image forming units 15. The image forming units 15 have similar configurations. Thus, the last signs indicative of the respective colors are omitted in the description.

As shown in the same drawing, the image forming unit 15 is arranged to contact the intermediate transfer belt 14, and includes a photoconductor drum 16 that rotates at a predetermined speed in a direction indicated by arrow F.

A charging roller 18 for electrically charging the photoconductor drum 16 is arranged at a peripheral surface (a surface) of the photoconductor drum 16. The charging roller 18 is a conductive roller, and is arranged such that a peripheral surface of the charging roller 18 contacts the peripheral surface of the photoconductor drum 16 and that the axial direction of the charging roller 18 is substantially aligned with the axial direction of the photoconductor drum 16.

A predetermined voltage in which a direct-current (DC) component and an alternate-current (AC) component are superposed is applied to the charging roller 18. The charging roller 18 electrically charges the surface of the photoconductor drum 16 to have a predetermined potential while the charging roller 18 follows the rotation of the photoconductor drum 16.

Also, an exposure unit 20 is provided at the peripheral surface of the photoconductor drum 16 at a position located downstream of the charging roller 18 in the rotation direction of the photoconductor drum 16 (the direction indicated by arrow F). The exposure unit 20 forms an electrostatic latent image on the photoconductor drum 16.

The exposure unit 20 includes a light-emitting diode (LED) array having plural LEDs 20A arranged along a first-scanning direction (in the front-rear direction on the paper face of FIG. 2). The exposure unit 20 radiates the photoconductor drum 16, which is uniformly electrically charged by the charging roller 18, with a light beam in accordance with input image information while the exposure unit 20 scans the photoconductor drum 16 in the axial direction. The potential of the region radiated with the light beam by the exposure unit 20 is increased, and the electrostatic latent image is formed on the photoconductor drum 16.

Further, a development unit 22 is arranged around the photoconductor drum 16 at a position located downstream of the exposure unit 20 in the rotation direction of the photoconductor drum 16. The development unit 22 develops the electrostatic latent image formed on the photoconductor drum 16 with a toner of a predetermined color (one of yellow, magenta, cyan, and black) and hence forms a toner image. The development unit 22 is connected with a toner box 44 that houses the toner, through a pipe (not shown). The toner that is supplied from the toner box 44 to the development unit 22 by a supply amount that is adjusted in accordance with a rotation time of a dispense motor (not shown).

In this exemplary embodiment, the toner is a developer containing two components including negative-polarity toner particles (coloring particles) and a positive-polarity carrier (magnetic particles). Also, in order to increase development efficiency and transfer efficiency (described later), the shape of each of the toner particles is desirably a spherical shape. In this exemplary embodiment, the development unit 22 is not supplied with the carrier, but is only supplied with the toner particles.

As shown in the same drawing, the development unit 22 includes a development roller 38 and a blade 40 arranged near the photoconductor drum 16. A predetermined voltage having the same polarity as the polarity of the surface of the photoconductor drum 16 (in this exemplary embodiment, a voltage having a negative polarity), in which a direct-current (DC) component and an alternate-current (AC) component are superposed, is applied to the development roller 38, and hence the toner particles are transported to the peripheral surface together with the positive-polarity carrier provided in the development unit 22. Also, the development roller 38 is rotationally driven in the same direction as the rotation direction of the photoconductor drum 16 (in a direction indicated by arrow G in the drawing). The toner particles and the carrier excessively adhering to the development roller 38 are removed by the blade 40 and as the result the toner particles and the carrier uniformly adhere to the development roller 38.

By the rotation of the development roller 38 in the direction indicated by arrow G, the toner adhering to the development roller 38 is supplied to the surface of the photoconductor drum 16.

A transfer roller 25 is provided around the photoconductor drum 16 at a position located downstream of the development unit 22 in the rotation direction of the photoconductor drum 16. The transfer roller 25 transfers the toner image on the photoconductor drum 16, on the intermediate transfer belt 14. The transfer roller 25 rotates in a direction indicated by arrow H and transports the intermediate transfer belt 14 at a predetermined speed to cause the intermediate transfer belt 14 to successively face the photoconductor drum 16. Also, the transfer roller 25 is connected with a power supply 42. A positive-polarity bias voltage is applied to the transfer roller 25, so that the toner on the photoconductor drum 16 is transferred on the intermediate transfer belt 14.

The transfer roller 25 transfers the toner on the photoconductor drum 16 to the intermediate transfer belt 14. At this time, not all the toner is transferred, and the toner slightly remains on the photoconductor drum 16 which has passed through the arrangement position of the transfer roller 25 (a non-transferred toner).

Also, the polarity of the toner may be reversed to plus by the transfer roller 25, and the toner may adhere onto the photoconductor drum 16 again (a retransferred toner). When the toner image passes through the arrangement position of the transfer roller 25, if a toner image of another color is already transferred on the intermediate transfer belt 14, the retransferred toner contains the toner of the other color.

Owing to this, a cleaning roller 24 is arranged downstream of the transfer roller 25, at the peripheral surface of the photoconductor drum 16. The cleaning roller 24 temporarily holds the non-transferred toner and or retransferred toner on the photoconductor drum 16. The cleaning roller 24 has conductive brush fibers implanted at the surface of the cleaning roller 24. The brush fibers contact the photoconductor drum 16. A bias voltage is applied to the cleaning roller 24. The cleaning roller 24 is rotationally driven.

A negative-polarity bias voltage (in this exemplary embodiment, −500 V) is applied to the cleaning roller 24 during formation of an image, and is rotated in the same direction as the rotation direction of the photoconductor drum 16. Accordingly, the plus-polarity retransferred toner adhering to the surface of the photoconductor drum 16 is attracted to the brush fibers and is recovered.

The cleaning roller 24 does not recover the minus-polarity non-transferred toner. The electrical charging and exposure are performed for the photoconductor drum 16 while the minus-polarity non-transferred toner adheres to the photoconductor drum 16. The non-transferred toner adhering to a non-image area is recovered into the development unit 22 when the carrier adhering to the development roller 38 of the development unit 22 slides on the toner.

The retransferred toner recovered by the cleaning roller 24 is discharged onto the photoconductor drum 16 by a cleaning mode that is executed during non-formation of an image.

In the cleaning mode, a positive-polarity bias voltage (in this exemplary embodiment, +500 V) is applied to the cleaning roller 24, and the cleaning roller 24 is rotated to follow the rotation of the photoconductor drum 16, in a direction different from the rotation direction of the photoconductor drum 16. Accordingly, the plus-polarity retransferred toner held on the cleaning roller 24 is discharged onto the photoconductor drum 16.

The retransferred toner discharged onto the photoconductor drum 16 as described above is transported to a transfer position by the rotation of the photoconductor drum 16.

In the cleaning mode, a negative-polarity bias voltage is applied to the transfer roller 25. The retransferred toner transported to the transfer position is transferred on the intermediate transfer belt 14 by the transfer roller 25, is transported to the cleaner 32 by the intermediate transfer belt 14, and is scraped by the blade 34 of the cleaner 32.

Figure 3:
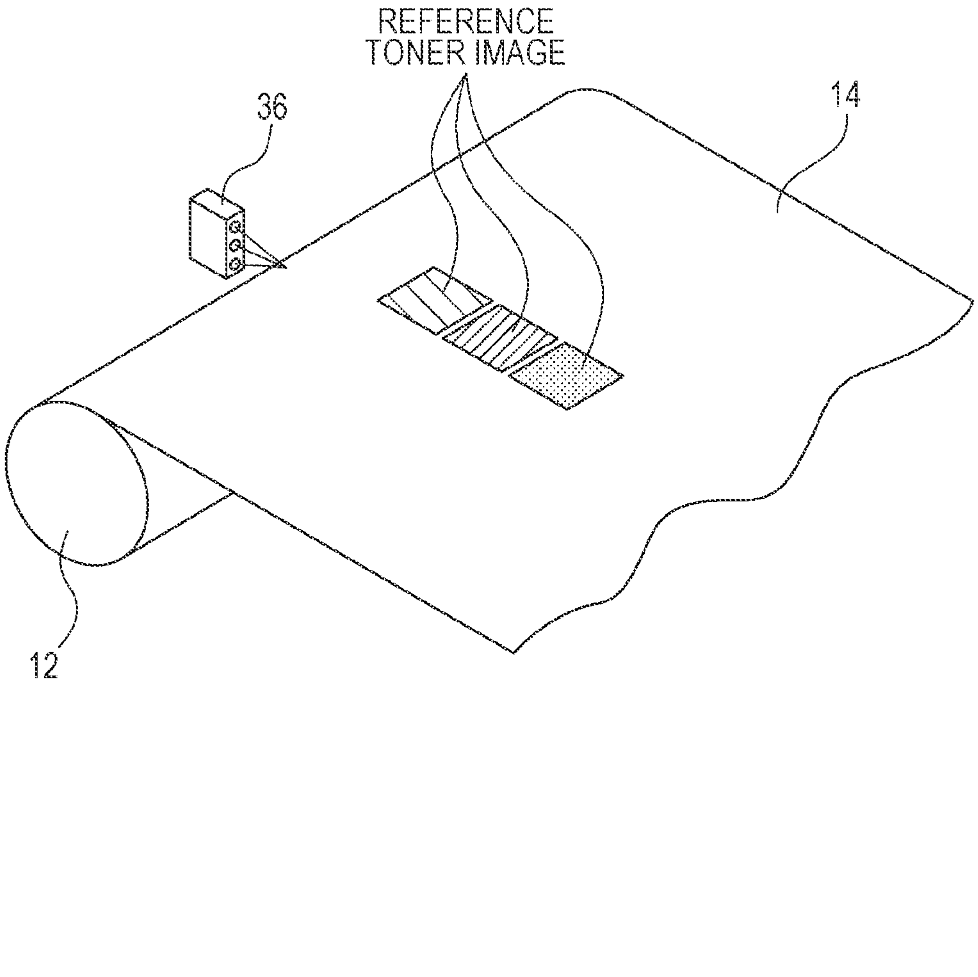
FIG. 3 is a brief configuration diagram showing an example of the positional relationship between a density sensor included in the image forming apparatus according to the exemplary embodiment and a reference toner image.

FIG. 3 is a brief configuration diagram showing an example of a manner that measures the density of a reference toner image by the density sensor 36. As shown in FIG. 3, a single reference toner image is formed or plural reference toner images are formed under different conditions (for example, conditions with different amounts per unit area of a toner of a specific color) by the image forming unit 15 in an image formed region on the surface of the intermediate transfer belt 14 (in the example shown in FIG. 2, a center portion in the width direction of the intermediate transfer belt 14). Then, the density sensor 36 radiates the single reference toner image or each of the plural reference toner images with light by a predetermined light quantity, and detects reflection light as the result of the radiation. Thus, the density sensor 36 measures the density of the reference toner image.

Figure 4:
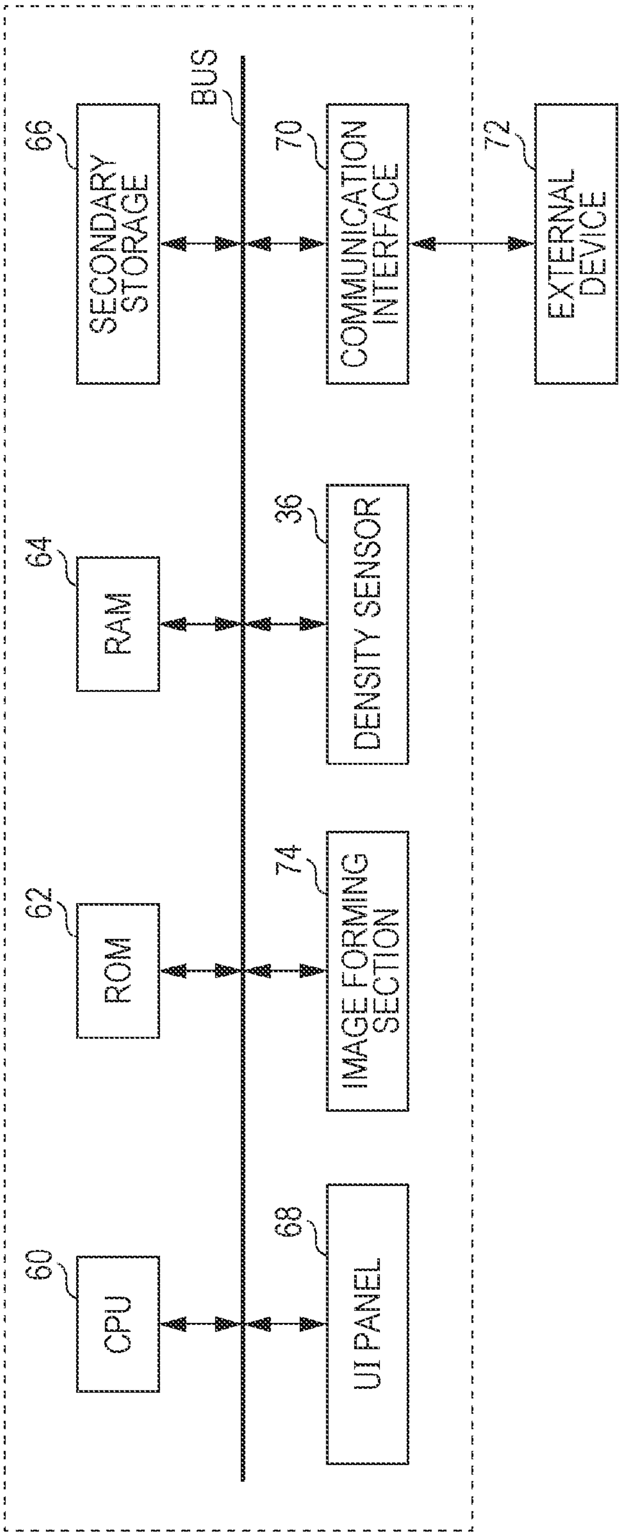
FIG. 4 is a block diagram showing an example of a configuration of an electric system of the image forming apparatus according to the exemplary embodiment.

FIG. 4 is a block diagram showing a configuration of an electric system of the image forming apparatus 10 according to this exemplary embodiment.

As shown in the same drawing, the image forming apparatus 10 includes the density sensor 36, a central processing unit (CPU) 60, a read only memory (ROM) 62, a random access memory (RAM) 64, a secondary storage (for example, a flash memory) 66, a user interface (UI) panel 68, a communication interface 70, and an image forming section 74.

The CPU 60 handles the entire operation of the image forming apparatus 10. The ROM 62 functions as a storage unit that previously stores, for example, control programs for controlling activation of the image forming apparatus 10, and various parameters. The programs stored in the ROM 62 may include, for example, a density adjustment instruction reception processing program, a density adjustment condition determination processing program, and an image formation processing program, which will be described later. The RAM 64 is used as a work area or the like when either of the various programs is executed. The secondary storage 66 stores various pieces of information that have to be held even if a power supply switch of the apparatus is turned OFF.

The UI panel 68 is formed of, for example, a touch panel in which a transmissive touch panel is superposed on a display. Various pieces of information are displayed on a display surface of the display, and various pieces of information and instructions are input when a user touches the touch panel.

The communication interface 70 is connected with an external device 72 such as a personal computer. The communication interface 70 receives various pieces of information such as image formation request information from the external device 72, and transmits various pieces of information to the external device 72. The “image formation request information” mentioned here is information that requests a single image or plural images to be formed on a corresponding sheet 28. The image formation request information according to the exemplary embodiment contains image information indicative of an image that is to be formed on the sheet 28.

The image forming section 74 performs image formation on the sheet 28 by the LED xerography method. The image forming section 74 includes the above-described image forming unit 15, the transfer device 26, and the fixing device 30 (for example, electrically controlled components shown in FIG. 1, other than the density sensor 36).

The density sensor 36, the CPU 60, the ROM 62, the RAM 64, the secondary storage 66, the UI panel 68, the communication interface 70, and the image forming section 74 are electrically connected with each other through a bus BUS such as a control bus. Hence, the CPU 60 handles access to the ROM 62, the RAM 64, and the secondary storage 66; display of various pieces of information on the UI panel 68; recognition of an operation instruction content of the user with respect to the UI panel 68; reception of various pieces of information from the external device 72 through the communication interface 70; control for activation of the density sensor 36 and the image forming section 74; recognition of the operation state of the image forming section 74; and recognition of the density measured by the density sensor 36. Also, the CPU 60 according to the exemplary embodiment performs image formation processing for forming an image indicated by image information contained in image formation request information of a single unit received from the external device 72 through the communication interface 70, in a corresponding image formed region. The image formation processing is achieved when the CPU 60 executes an image formation processing program, which will be described later.

The image forming apparatus 10 according to the exemplary embodiment uses a density adjustment value that is predetermined so that the density of an image formed on a sheet 28 becomes a predetermined density (for example, a density that is previously determined as a density required for forming an image with a predetermined or higher image quality). The "density adjustment value" mentioned here is a value that adjusts a control value used in density control processing, which is an example of a density adjustment method for controlling the density of an image. The "density control processing" mentioned here is, for example, gradation correction processing, toner concentration (TC) control processing, and surface potential control processing. The processing listed above is performed when the CPU 60 of the image forming apparatus 10 executes an image formation processing program, which will be described later. The gradation correction processing represents processing for acquiring image information indicative of an image to be formed on a sheet 28, and correcting the gradation of the acquired image information. In this case, a correction amount that is applied by the gradation correction processing corresponds to the density adjustment value. Also, the TC control processing represents control for adjusting the ratio of toner particles contained in the toner in the development unit 22 with respect to the toner. In this case, a TC control value that is used for adjusting the ratio of the toner particles corresponds to the density adjustment value. Also, the surface potential control processing represents processing for adjusting the density of an image by controlling a potential that is applied to the surface of the photoconductor drum 16. In this case, a control value for collectively controlling a charge amount of the surface of the photoconductor drum 16, a light quantity of a light beam radiated from the exposure unit 20, the magnitude of the voltage that is applied to the development roller 38, and the magnitude of the bias voltage that is applied to the transfer roller 25 corresponds to the density adjustment value.

Also, the density adjustment value is selectively adjusted by a predetermined basic change amount and a predetermined fine change amount. The basic change amount represents a change amount of the density adjustment value, the change amount of which is applied when a density adjustment condition for adjusting the density of an image is satisfied. For example, if the density adjustment value is changed by one step, the basic change amount represents the change amount of one step. If the density adjustment value is changed by multiple steps, the basic change amount represents the total change amount of multiple steps. In contrast, the fine change amount represents a change amount of the density adjustment value, the change amount which is applied, after the density adjustment value is changed by the basic change amount, every time when a single image is formed, until the density adjustment condition is satisfied again. Also, in the exemplary embodiment, the basic change amount does not have an upper limit, but the fine change amount has an upper limit so as to be smaller than the basic change amount.

In particular, the basic change amount is a change amount that is predetermined as an amount by which the density adjustment value is changed, so that when a single image is formed in a corresponding image formed region with a density adjusted in accordance with a current density adjustment value, a deviation between a target density of the image and an actual density of the image is restricted. In contrast, the fine change amount is a change amount that is smaller than the basic change amount and that is predetermined as an amount by which the density adjustment value is changed, so that when a single image is formed in a corresponding image formed region with a density adjusted in accordance with a current density adjustment value, a deviation between a target density of the image and an actual density of the image is restricted.

The "density adjustment condition" mentioned here is, for example, lapse of a predetermined period of time since a certain timing (for example, a timing at which the development unit 22 is replaced), or occurrence of a change in environment that is previously expected that a deviation amount between the density of the image formed on the intermediate transfer belt 14 and the target density exceeds a predetermined deviation amount. An example of the "change in environment" may be a change in at least one of the temperature and humidity exceeding a previously expected change, or a situation in which a member used for forming an image (for example, the photoconductor drum 16 or the development unit 22) is replaced with new one.

If the density adjustment condition is satisfied, each of plural reference toner images is formed on the intermediate transfer belt 14 with the density adjusted in accordance with the current density adjustment value, and the density of each of the formed plural reference toner images is measured by the density sensor 36. Then, the basic change amount that is previously determined to reduce the deviation between the measured density of each reference toner image and the target density of the reference toner image is derived from a predetermined table or with an arithmetic expression, and the density adjustment value is changed by the derived basic change amount. However, the members used for the image formation processing are continuously gradually deteriorated. Owing to this, even if the density adjustment value is changed by the basic change amount, the density adjustment value may not be eternally effective. Hence, after the density adjustment value is changed by the basic change amount, the density adjustment value is finely changed by the fine change amount when a single image is formed. As long as the density adjustment value is changed once by the basic change amount, the density change amount is sufficiently changed by the fine change amount every time when a single image is formed unless the density adjustment condition is established. Owing to this, the fine change amount does not have to be as large as the basic change amount.

Figure 5:
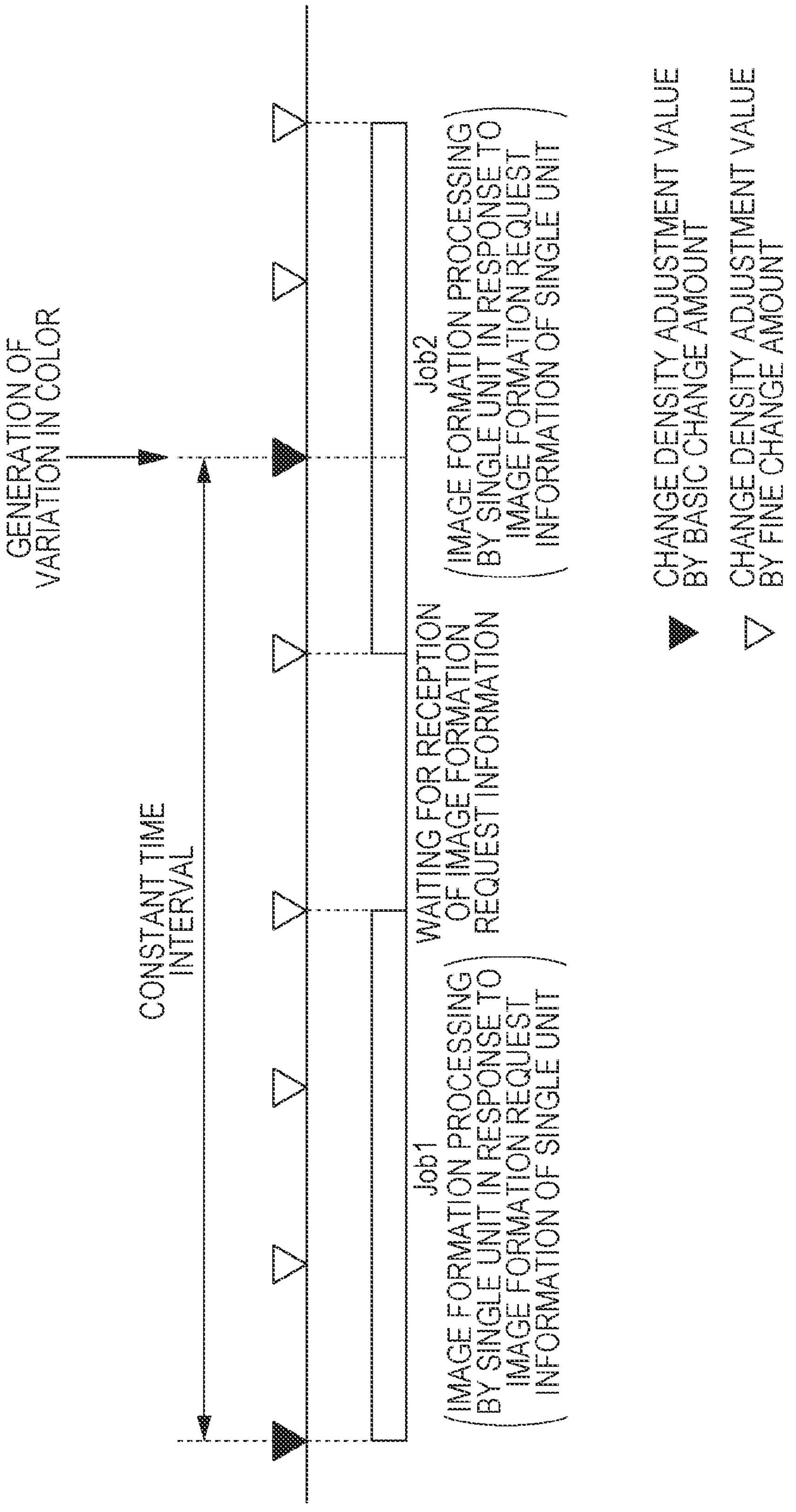
FIG. 5 RELATED ART
FIG. 5 is a schematic illustration for explaining a change timing of a density adjustment value in an image forming apparatus of related art.

However in related art, for example, as shown in FIG. 5, if a predetermined period of time elapses since a certain timing (for example, a timing at which the development unit 22 is replaced), or if a change in environment, which is previously expected that a deviation amount between a density of an image formed on the intermediate transfer belt 14 and a target density exceeds the predetermined deviation amount, occurs (if a variation in color is generated), the density adjustment value is changed by a basic change amount, and density control processing is executed in accordance with the changed density adjustment value.

If the density adjustment value is changed by the basic change amount in the case in which the change in environment occurs, when plural images are requested to be formed by image formation request information received by the CPU 60, the density control processing may be forcedly executed while the images are formed. In the example shown in FIG. 5, from among former image formation processing by a single unit and later image formation processing by a single unit (in the example in FIG. 5, Job 1 and Job 2) respectively executed in response to former image formation request information of a single unit and later image formation request information of a single unit received by the CPU 60, a change in environment does not occur in the former image formation processing by a single unit, but a change in environment occurs during execution of the later image formation processing by a single unit (a change in environment that a non-allowable variation in color is generated (a previously expected change in environment). Hence the density adjustment value is changed by the basic change amount during the execution of the image formation processing, and a later image is formed in accordance with the changed density adjustment value. Owing to this, if each of plural images is formed by image formation processing by a single unit, an image in the middle may have an image quality that is markedly changed from that of a previously formed image. In many cases, if plural images are formed by the image formation processing by a single unit, images are the same or images are similar to each other. Hence, if the image quality is markedly changed in the middle of the processing, it may be disadvantageous to the user.

Therefore, the image forming apparatus 10 according to the exemplary embodiment executes density adjustment instruction reception processing, density adjustment condition determination processing, and image formation processing, to restrict occurrence of a situation in which, if plural images are formed through execution of image formation processing by a single unit, the image quality is changed in the middle of the processing. The density adjustment instruction reception processing is processing of receiving an instruction for adjusting the density of an image in accordance with the intention of the user (a density adjustment instruction). The density adjustment condition determination processing is processing of determining whether the density adjustment condition is satisfied or not. The image forming apparatus 10 according to the exemplary embodiment achieves any of the density adjustment instruction reception processing, the density adjustment condition determination processing, and the image formation processing, by executing a program with a computer. However, the processing does not have to be achieved by the software configuration, and may be achieved by a hardware configuration, or combination of the hardware configuration and the software configuration.

Described below is a case in which the image forming apparatus 10 according to the exemplary embodiment achieves the density adjustment instruction reception processing, the density adjustment condition determination processing, and the image formation processing. In this case, the program may be previously stored in the ROM 62, the program may be previously stored in a recording medium and the stored content may be read by a computer, or the program may be distributed through a communication unit with a wire or without a wire.

Figure 6:
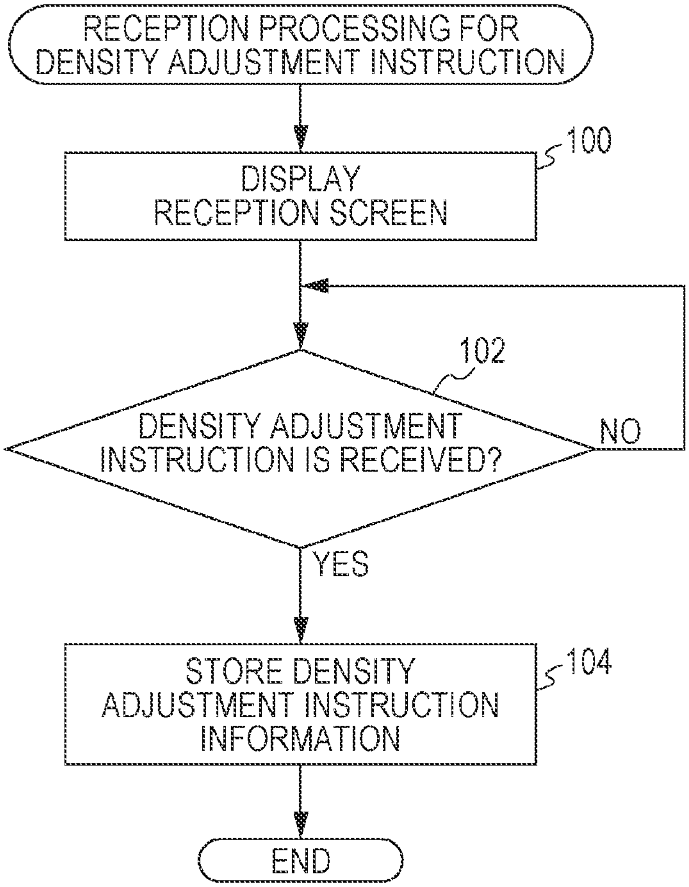
FIG. 6 is a flowchart showing an example of a processing flow of a density adjustment instruction reception processing program according to the exemplary embodiment.

An operation of the image forming apparatus 10 according to the exemplary embodiment is described below. First, an operation of the image forming apparatus 10 when the density adjustment instruction reception processing is executed is described with reference to FIG. 6. FIG. 6 is a flowchart showing an example of a processing flow of the density adjustment instruction reception processing program executed by the CPU 60 when the UI panel 68 receives an instruction indicative of execution of the density adjustment instruction reception processing.

Figure 7:
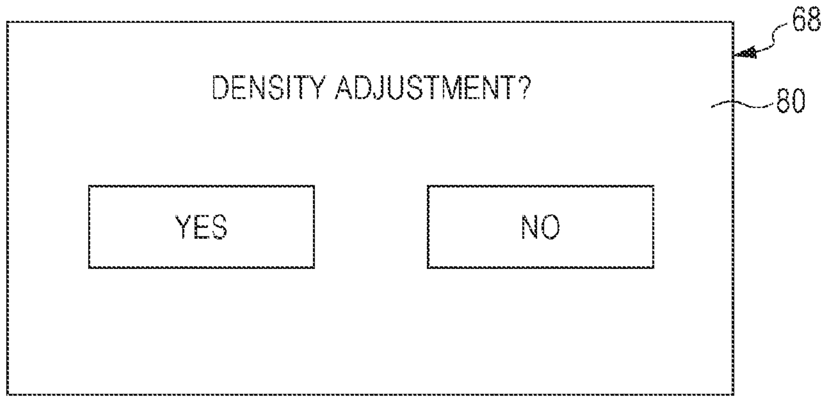
FIG. 7 illustrates an example of a first density adjustment instruction reception screen displayed on an UI panel included in the image forming apparatus according to the exemplary embodiment.

In step 100 in FIG. 6, a first density adjustment instruction reception screen is displayed on the UI panel 68, and then the process goes to step 102, in which the process waits for reception of a density adjustment instruction. FIG. 7 illustrates a first density adjustment instruction reception screen 80 being an example of a first density adjustment instruction reception screen. As shown in FIG. 7, a message that asks whether or not the user of the image forming apparatus 10 requests execution of the density control processing is displayed in the first density adjustment instruction reception screen 80. In the example in FIG. 7, a message of a question "density adjustment?" is displayed. Also, reception buttons for receiving the answer of the user for the question "density adjustment?" are displayed in the first density adjustment instruction reception screen 80. In the example in FIG. 7, a "YES" button and a "NO" button are displayed. If the "YES" button is designated, a second density adjustment instruction reception screen is displayed on the UI panel 68. If the "NO" button is designated, a predetermined standby screen (for example, a default screen) is displayed.

Figure 8:
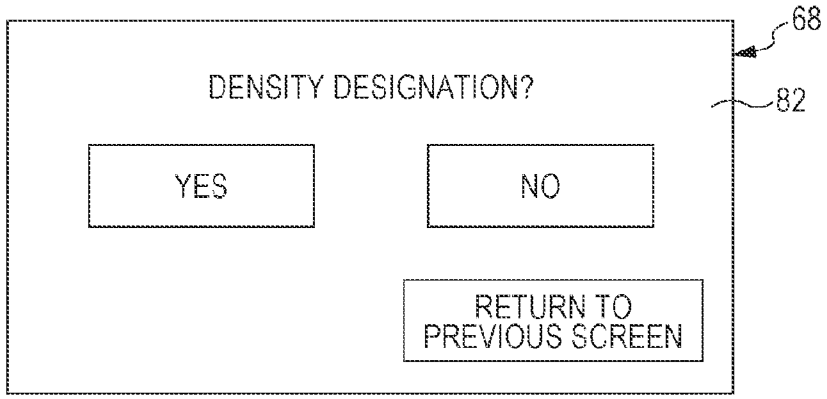
FIG. 8 illustrates an example of a second density adjustment instruction reception screen displayed on the UI panel included in the image forming apparatus according to the exemplary embodiment.

FIG. 8 illustrates a second density adjustment instruction reception screen 82 being an example of a second density adjustment instruction reception screen. As shown in FIG. 8, a message that asks the user whether or not the density of an image is designated is displayed in the second density adjustment instruction reception screen 82. In the example in FIG. 8, a message of a question "density designation?" is displayed. Also, reception buttons for receiving the answer of the user for the question "density designation?" are displayed in the second density adjustment instruction reception screen 82. In the example in FIG. 8, a "YES" button and a "NO" button are displayed. If the "YES" button is designated, a third density adjustment instruction reception screen is displayed on the UI panel 68. If the "NO" button is designated, standard density request information for requesting that the density of an image is set to a standard density is generated by the CPU 60, step 102 is determined as YES, and the process goes to step 104. In the example in FIG. 8, a "return to previous screen" button is displayed. If the "return to previous screen" button is designated, the first density adjustment instruction reception screen is displayed.

Figure 9:
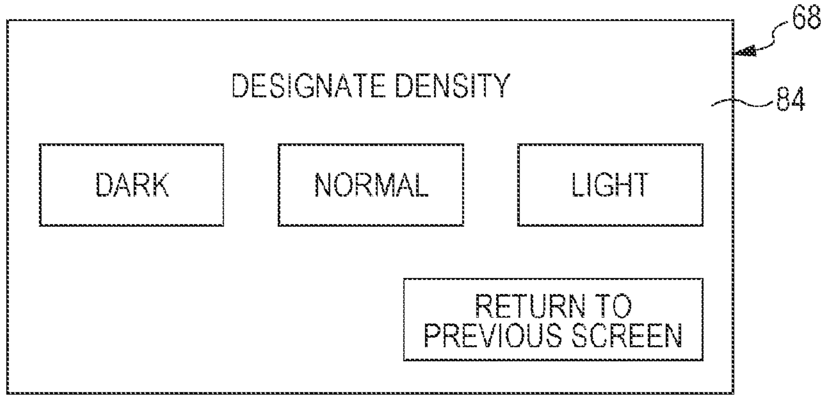
FIG. 9 illustrates an example of a third density adjustment instruction reception screen displayed on the UI panel included in the image forming apparatus according to the exemplary embodiment.

FIG. 9 illustrates a third density adjustment instruction reception screen 84 being an example of a third density adjustment instruction reception screen. As shown in FIG. 9, a message that urges the user to designate the density of an image is displayed in the third density adjustment instruction reception screen 84. In the example in FIG. 9, a message "designate density" is displayed. Also, in the example in FIG. 9, displayed in the third density adjustment instruction reception screen 84 are a "dark" button that is designated if the density of the image is requested to be higher than the standard density, a "normal" button that is designated if the density of the image is requested to be the standard density, and a "light" button that is designated if the density of the image is requested to be lower than the standard density. If the "dark" button is designated, the CPU 60 generates high-density request information for requesting that the density of the image becomes higher than the standard density. If the "normal" button is designated, the CPU 60 generates standard-density request information. If the "light" button is designated, the CPU 60 generates low-density request information for requesting that the density of the image becomes lower than the standard density. If any of the "dark" button, the "normal" button, and the "light" button is designated in the third density adjustment instruction reception screen 84, step 102 is determined as YES, and the process goes to step 104. In the example in FIG. 9, a "return to previous screen" button is displayed. If the "return to previous screen" button is designated, the second density adjustment instruction reception screen is displayed.

In step 104, the density adjustment instruction information indicative of the reception of the density adjustment instruction is stored in a predetermined storage region $\alpha$ of the secondary storage 66, and then the density adjustment instruction reception processing program is ended. If the “dark” button is designated in the third density adjustment instruction reception screen 84, the density adjustment instruction information contains the high-density request information. If the “NO” button is designated in the second density adjustment instruction reception screen 82 or if the “normal” button is designated in the third density adjustment instruction reception screen 84, the density adjustment instruction information contains the standard-density request information. If the “light” button is designated in the third density adjustment instruction reception screen 84, the density adjustment instruction information contains the low-density request information. In the following description, if the high-density request information, the standard-density request information, and the low-density request information do not have to be distinguished from each other, the information is merely called “density request information.”

Figure 10:
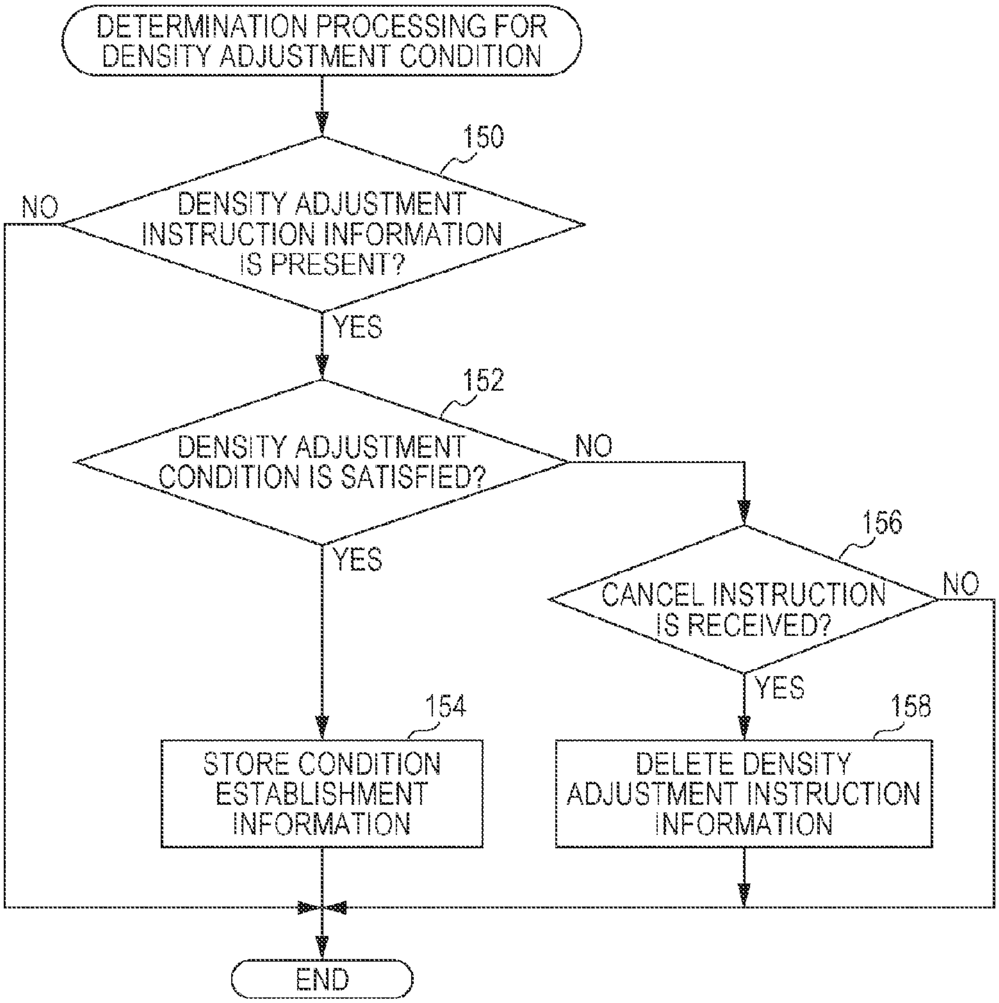
FIG. 10 is a flowchart showing an example of a processing flow of a density adjustment condition determination processing program according to the exemplary embodiment.

An operation of the image forming apparatus 10 when the density adjustment condition determination processing is executed is described with reference to FIG. 10. FIG. 10 is a flowchart showing an example of a processing flow of the density adjustment condition determination processing program that is executed at a predetermined time interval (for example, every 0.1 seconds) by the CPU 60 of the image forming apparatus 10.

In step 150 in FIG. 6, it is determined whether or not the density adjustment instruction information is stored in the storage region α of the secondary storage 66. If NO, the density adjustment condition determination processing program is ended. If YES, the process goes to step 152. In step 152, it is determined whether or not the density adjustment condition is satisfied. If YES, the process goes to step 154. In step 154, condition establishment information indicative of that the density adjustment condition is satisfied is stored in a predetermined storage region β of the secondary storage 66, and then the density adjustment condition determination processing program is ended.

If NO in step 152, the process goes to step 156. In step 156, it is determined whether or not the UI panel 68 receives an instruction for canceling the density adjustment instruction (a cancel instruction). If NO, the density adjustment condition determination processing program is ended. If YES, the process goes to step 158. In step 158, the density adjustment instruction information is deleted from the storage region α of the secondary storage 66, and then the density adjustment condition determination processing program is ended.

Figure 11:
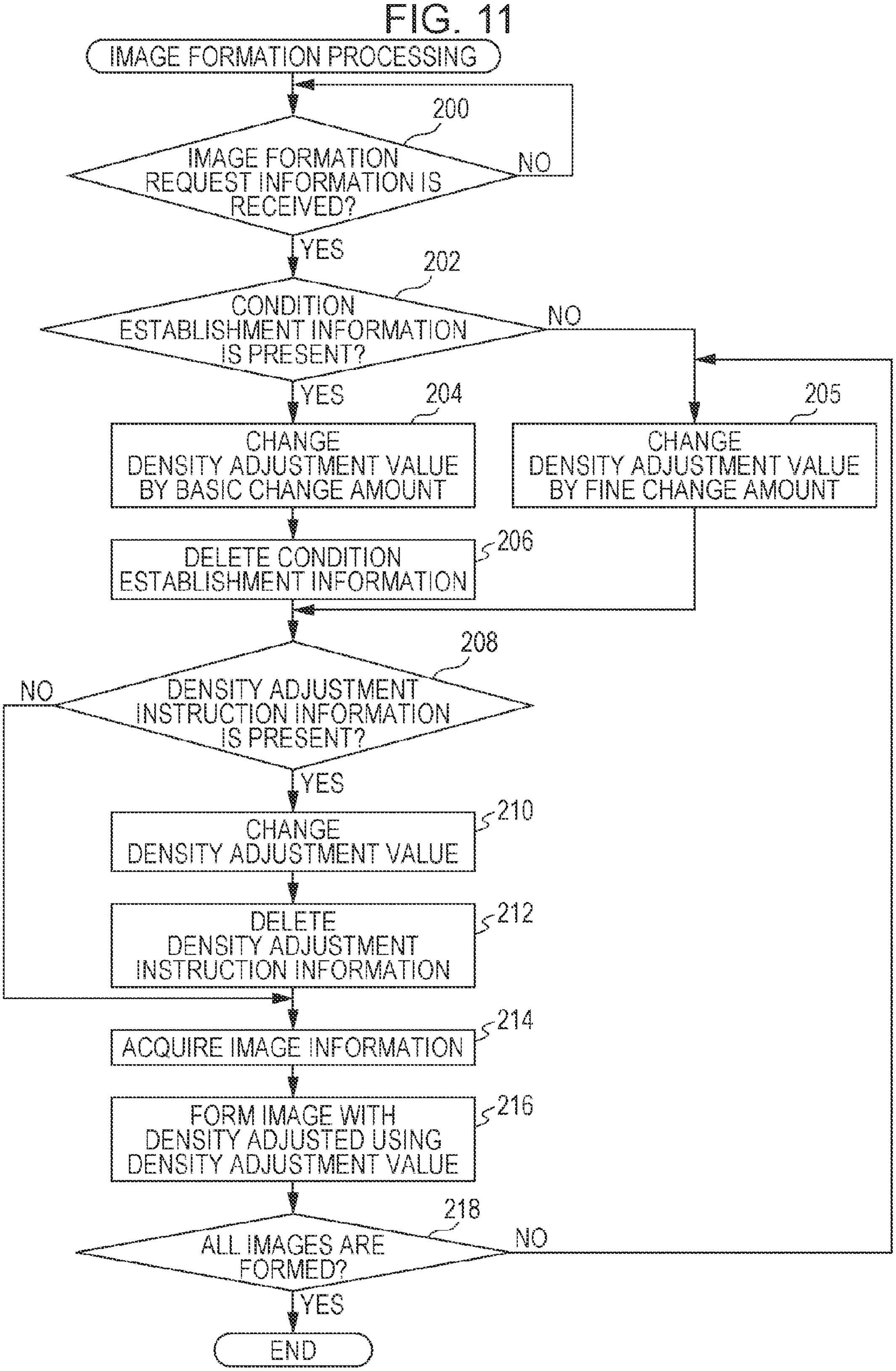
FIG. 11 is a flowchart showing an example of a processing flow of an image formation processing program according to the exemplary embodiment.

An operation of the image forming apparatus 10 when the image formation processing is executed is described with reference to FIG. 11. FIG. 11 is a flowchart showing an example of a processing flow of the image formation processing program that is executed when the power supply of the image forming apparatus 10 is turned ON.

In step 200 in FIG. 11, the process waits for reception of image formation request information. In step 200, if the CPU 60 receives image formation request information of a single unit, YES is determined in step 200, and the process goes to step 202. In step 202, it is determined whether or not the condition establishment information is stored in the storage region β of the secondary storage 66, and if YES, the process goes to step 204.

Figures 12, 13, 14:
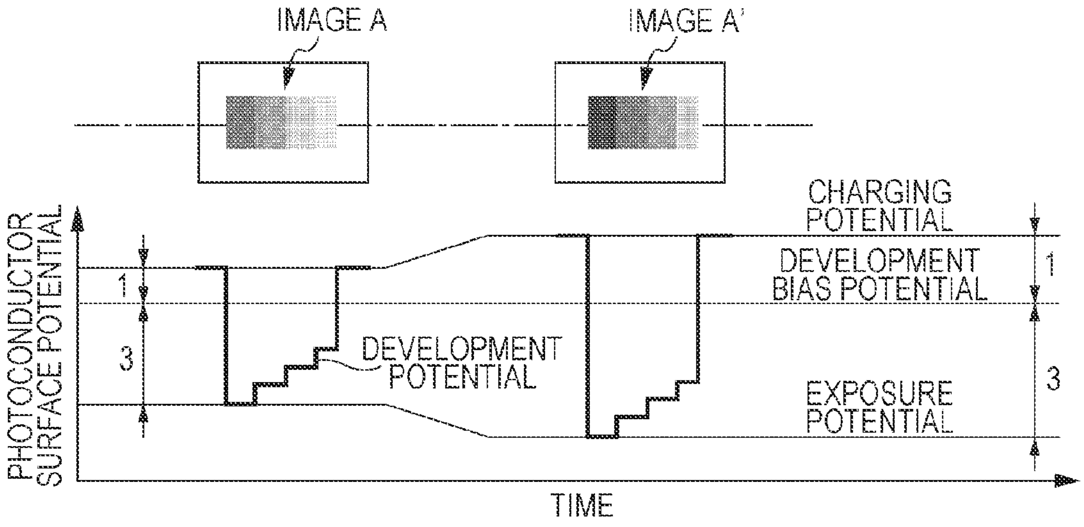
FIG. 12 is a schematic illustration showing an example of a structure of a basic change amount derivation table according to the exemplary embodiment.
FIG. 13 is a graph showing an example of a transition state of a surface potential of a photoconductor drum included in the image forming apparatus according to the exemplary embodiment.
FIG. 14 is a schematic illustration showing an example of a structure of a fine change amount derivation table according to the exemplary embodiment.

In step 204, the density adjustment value is changed by the basic change amount, then the process goes to step 206, in which the condition establishment information is deleted from the storage region β of the secondary storage 66, and then the process goes to step 208. In step 204, for example, a reference toner image is formed on the surface of the intermediate transfer belt 14, a basic change amount for causing the density adjustment value to achieve the target density is derived from a predetermined table or with an arithmetic expression based on the result obtained by measuring the density of the formed reference toner image with the density sensor 36, and the density adjustment value is changed by the derived basic change amount. The basic change amount is derived, for example, as shown in FIG. 12, by using a basic change amount derivation table 90 in which basic change amounts $A_n$ are respectively assigned to plural densities $X_n$ that are expected as densities obtained by measuring the densities of reference toner images. In particular, when the density adjustment value is changed by the basic change amount, the reference toner image is formed on the surface of the intermediate transfer belt 14, and the density of the formed reference toner image is measured by the density sensor 36. Then, the basic change amount corresponding to the density measured by the density sensor 36 is derived from the basic change amount derivation table 90. In this case, the basic change amount derivation table 90 may be previously stored in the ROM 62, the basic change amount derivation table 90 may be previously stored in a recording medium and the stored content may be read by a computer, or the basic change amount derivation table 90 may be distributed through a communication unit with a wire or without a wire. Alternatively, the basic change amount may be calculated with an arithmetic expression instead of using the basic change amount derivation table 90.

The density adjustment value may be changed by the basic change amount derived as described above, for example, by changing a correction amount applied to gradation correction processing by a basic change amount that is predetermined for the gradation correction processing (a gradation correction basic change amount); by changing a TC control value applied to TC control processing by a basic change amount that is predetermined for the TC control processing (a TC control basic change amount); or by changing a control value applied to surface potential control processing by a basic change amount that is predetermined for the surface potential control processing (a surface potential basic change amount).

In the image forming apparatus 10 according to the exemplary embodiment, the control value applied to the surface potential control processing is changed within a range that the ratio of the absolute value of the difference between a potential with which the surface of the photoconductor drum 16 is electrically charged (a charging potential) and a bias potential for development used when the development unit 22 performs development (a development bias potential), to the absolute value of the difference between the development bias potential and a potential of a region radiated by the exposure unit 20 with a light beam (an exposure potential) is held before and after the control value is changed. For example, as shown in FIG. 13, when a single image A and a single image A' with a higher density than the density of the single image A are continuously formed in the image formed region on the surface of the intermediate transfer belt 14, the control value is changed within a range that the ratio of the absolute value of the difference between the charging potential and the development bias potential to the absolute value of the difference between the development bias potential and the exposure potential is held to 1:3. In particular, when the single image A is formed and then the single image A' is formed, the control value is changed such that the difference between the charging potential and the exposure potential is increased while the development bias potential is fixed, to hold the ratio of the absolute value of the difference between the charging potential and the development bias potential to the absolute value of the difference between the development bias potential and the exposure potential is held to 1:3. In contrast, if the single image A' is formed and then the single image A is formed, the ratio of the absolute value of the difference between the charging potential and the development bias potential to the absolute value of the difference between the development bias potential and the exposure potential may be held when the single image A' is formed and when the single image A is formed. This represents that the images are output while the gradation density characteristic is held. In other words, the entire densities are changed while visual impression received from the images output before and after the density adjustment is not disordered. The reason for holding constant the ratio of the absolute value of the difference between the charging potential and the development bias potential to the absolute value of the difference between the development bias potential and the exposure potential constant is for holding the gradation density characteristic (a gradation characteristic curve) of the images formed in the image formed region on the surface of the intermediate transfer belt 14.

Figure 16:
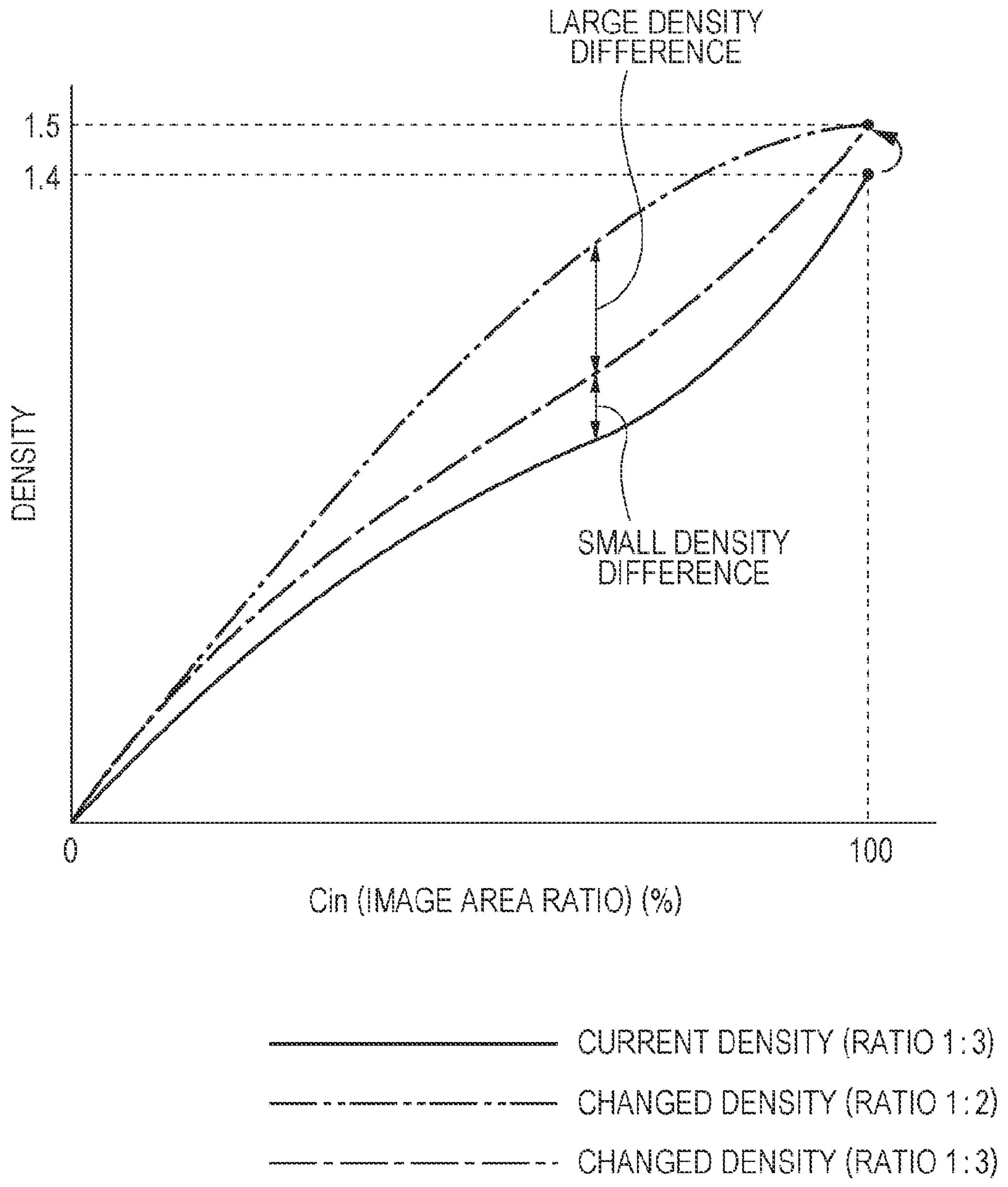
FIG. 16 is a graph showing an example of transition of image area ratios when the ratio of the absolute value of the difference between a charging potential and a development bias potential to the absolute value of the difference between the development bias potential and an exposure potential is changed upon density adjustment and when the ratio is not changed.

FIG. 16 shows an example of transition of image area ratios when the ratio of the absolute value of the difference between the charging potential and the development bias potential to the absolute value of the difference between the development bias potential and the exposure potential is changed upon density adjustment and when the ratio is not changed. In the example in FIG. 16, when Cin (an image area ratio) is increased by 0.1 (from 1.4 to 1.5), the density difference between intermediate densities in a case in which the ratio is held to 1:3 is smaller than the density difference between intermediate densities in a case in which the ratio is changed to 1:2. Owing to this, a variation in visual impression received from the output images upon the change in density in the case in which the ratio is held to 1:3 becomes smaller than that in the case in which the ratio is changed to 1:2. The situation "a variation in visual impression becomes smaller" represents that if the output image contains an image indicating hairs and an image indicating the blue sky, the image of the hairs is collapsed, and the image of the blue sky loses the color and becomes white.

If NO in step 202, the process goes to step 205. In step 205, the density adjustment value is changed by the fine adjustment value, and then the process goes to step 208. In step 205, for example, a reference toner image is formed on the surface of the intermediate transfer belt 14, a fine change amount for causing the density adjustment value to achieve the target density is derived from a predetermined table or with an arithmetic expression based on the result obtained by measuring the density of the formed reference toner image with the density sensor 36, and the density adjustment value is changed by the derived fine change amount. The fine change amount is derived, for example, as shown in FIG. 14, by using a fine change amount derivation table 92 in which fine change amounts $a_n$ are respectively assigned to plural densities $X_n$ that are expected as densities obtained by measuring the densities of reference toner images. In this case, the fine change amount derivation table 92 may be previously stored in the ROM 62, the fine change amount derivation table 92 may be previously stored in a recording medium and the stored content may be read by a computer, or the fine change amount derivation table 92 may be distributed through a communication unit with a wire or without a wire. Alternatively, the fine change amount may be calculated with an arithmetic expression instead of using the fine change amount derivation table 92.

When the fine change amount is derived by using the fine change amount derivation table 92, for example, a reference toner image is formed on the surface of the intermediate transfer belt 14. Then, the density of the formed reference toner image is measured by the density sensor 36. Then, the fine change amount corresponding to the density measured by the density sensor 36 is derived from the fine change amount derivation table 92. The density of the reference toner image shown in the fine change amount derivation table 92 is desirably a density that involves an error of the density measured by the density sensor 36, unlike the density of the reference toner image shown in the basic change amount derivation table 90. The "error of the density" mentioned here is, for example, a measurement error of the density sensor 36. The density of the reference toner image shown in the fine change amount derivation table 92 is expressed by an integer, then if the density measured by the density sensor 36 is expressed to two decimal places such as 5.12%, the first decimal place is rounded and an integer is obtained, and the obtained integer is applied to the fine change amount derivation table 92, thereby deriving a fine change coefficient. Each of a TC control fine change amount and a surface potential fine change amount may be derived from a table corresponding to the fine change amount derivation table 92 with use of the actually measured density of the reference toner image. Alternatively, the fine change amount may be derived by using a table in which at least one of an actually measured density, an elapsed time, a current temperature, and a current humidity is associated with the fine change amount. Still alternatively, the fine change amount may be derived depending on an elapsed time since the density adjustment value is changed by the basic change amount, without formation of a reference toner image. In this case, for example, the fine change amount may be derived by using a table in which the elapsed time is associated with the fine change amount. Further alternatively, the fine change amount may be derived by using a table in which at least one of the elapsed time, the current temperature, and the current humidity is associated with the fine change amount.

The density adjustment value may be changed by the fine change amount derived as described above, for example, by changing a correction amount applied to gradation correction processing by a fine change amount that is predetermined for the gradation correction processing (a gradation correction fine change amount); by changing a TC control value applied to TC control processing by a fine change amount that is predetermined for the TC control processing (a TC control fine change amount); or by changing a control value applied to surface potential control processing by a fine change amount that is predetermined for the surface potential control processing (a surface potential fine change amount). In the later process, until the image adjustment condition is satisfied again and the image formation processing based on image formation request information of a single unit is executed, if one or two processing from among the gradation correction processing is previously determined not to be executed, the TC control processing, and the surface potential control processing, the density adjustment value for the processing other than the not executed processing may be changed by the fine change amount.

Also, a specific method of changing the density adjustment value may be a changing method by multiplying the density adjustment value by a coefficient. In this case, a coefficient used when the density adjustment value is changed by the fine change amount is smaller than a coefficient used when the density adjustment value is changed by the basic change amount. For example, when a gamma curve is used as the density adjustment value applied to the gradation correction processing, and when the current gamma curve is changed by multiplying the gamma curve by a predetermined coefficient, a coefficient used for changing the gamma curve by the fine change amount (a fine change coefficient, see FIG. 14) is a value that is equivalent to or smaller than a half of a coefficient used for changing the gamma curve by the basic change amount (a basic change coefficient).

In step 208, it is determined whether or not the density adjustment instruction information is stored in the storage region α of the secondary storage 66. If YES, the process goes to step 210. If NO, the process goes to step 214. In step 210, the density adjustment value is changed, and then the process goes to step 212. In step 210, for example, to form an image with a density requested by density request information contained in density adjustment instruction information, a reference toner image corresponding to the density requested by the density request information (high density, standard density, or low density) is formed on the surface of the intermediate transfer belt 14; the density of the formed reference toner image is measured by the density sensor 36; the change amount that causes the density adjustment value to achieve the target density is derived from a predetermined table (for example, a table corresponding to the basic change amount derivation table 90) or with an arithmetic expression based on the result of the density measured by the density sensor 36; and the density adjustment value is changed by the derived change amount.

In step 212, the density adjustment instruction information is deleted from the storage region α of the secondary storage 66, and then the process goes to step 214. In step 214, image information indicative of a single image contained in the image formation request information acquired in the processing of step 200 is acquired, and then the process goes to step 216. In step 216, the image forming section 74 is controlled such that the single image indicated by the image information acquired in the processing of step 214 is formed on a sheet 28 with the density adjusted in accordance with the density adjustment value, and then the process goes to step 218. In step 218, it is determined whether or not images of all the image information contained in the image formation request information acquired in the processing of step 200 are formed. If NO, the process returns to step 205. If YES, the image formation processing program is ended.

Figure 15:
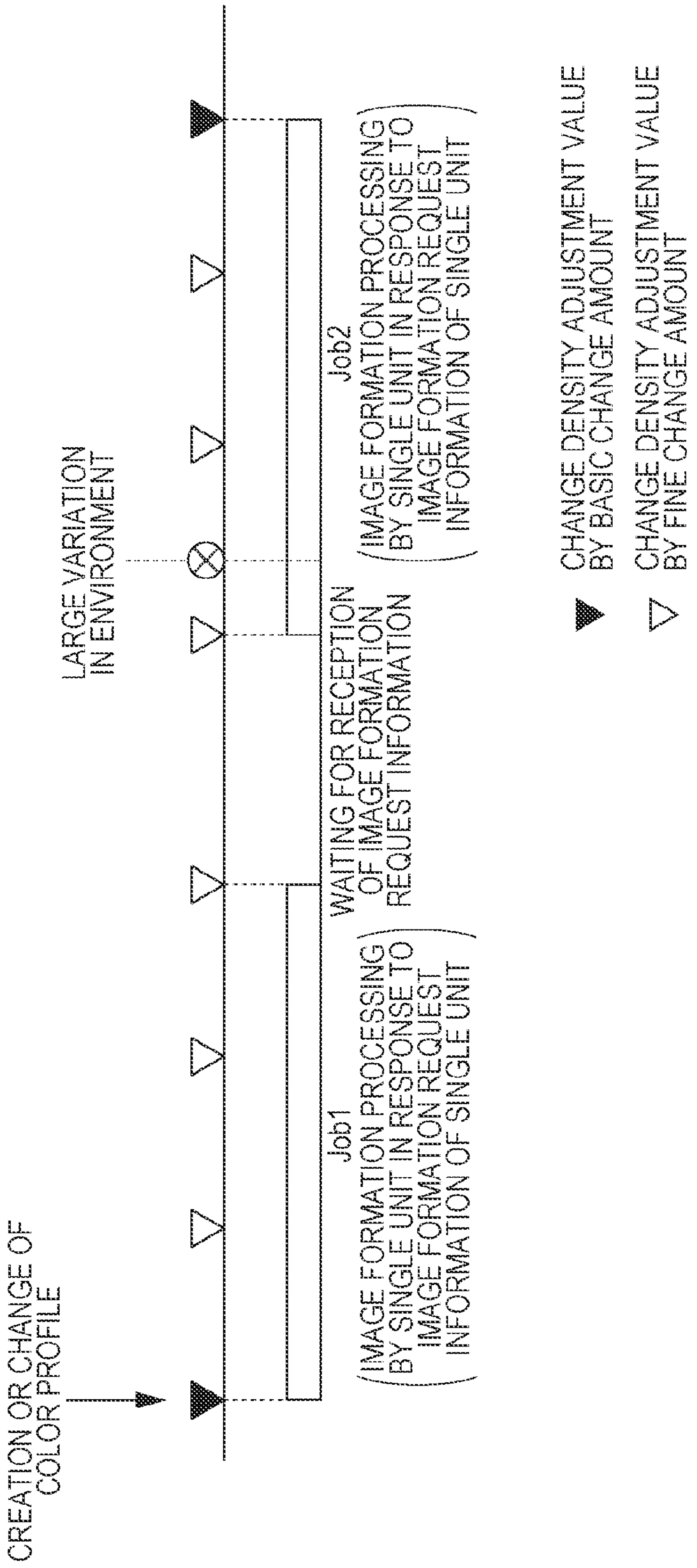
FIG. 15 is a schematic illustration for explaining a change timing of a density adjustment value in the image forming apparatus according to the exemplary embodiment.

Hence, for example, as shown in FIG. 15, even if the image adjustment condition is satisfied while the image formation processing by a single unit is executed (the image formation processing program is executed) in response to the image formation request information of a single unit, the density adjustment value is not adjusted by the basic change amount until the currently executed image formation processing by a single unit is completed. Accordingly, a phenomenon in which the image quality of an image in the middle of plural images formed by the image formation processing by a single unit becomes markedly different from the image quality of previously formed images is prevented from occurring.

In the exemplary embodiment, the reference toner image, which is a measurement subject for the density that is adjusted in accordance with the density adjustment value, is formed on the intermediate transfer belt 14. However, it is not limited thereto. The reference toner image, which is a measurement subject for the density that is adjusted in accordance with the density adjustment value, may be formed on a sheet 28. In this case, the density sensor 36 may be arranged such that the density of the reference toner image formed on the sheet 28 is measured by the density sensor 36.

Also, in the exemplary embodiment, the density is adjusted according to the intention of the user such that the user designates the "dark" button, the "normal" button, or the "light" button through the UI panel 68. However, the density may be more finely adjusted such that the user designates a level of the density of a single-color YMCK, a secondary-color RGM, or a gray balance; or a gamma curve through the UI panel 68 or the external device 72. Also, the user may create a color profile through the UI panel 68 or the external device 72, and may perform density adjustment in accordance with the color profile. The color profile is provided so that the user creates a color conversion table of Y, M, C, and K for matching of colors of the image forming apparatus 10. The color profile is used when the user executes density adjustment at a desirable timing.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus, comprising:

an image forming unit that respectively forms a plurality of images in a plurality of corresponding image formed regions by executing image formation processing by a single unit, with a density that is adjusted in accordance with a predetermined density adjustment value; and a controller that provides control in which, if the image formation processing by the single unit is executed first since a density adjustment condition for adjusting a density of an image is satisfied, the density adjustment value is changed by a predetermined basic change amount, and a first image is formed in the corresponding image formed region by the image forming unit with a density that is adjusted in accordance with the changed density adjustment value, and control in which, if a single image other than the first image is formed in the corresponding image formed region, the current density adjustment value is changed by a predetermined fine change amount that is smaller than the basic change amount, and the single image is formed in the corresponding image formed region by the image forming unit with a density that is adjusted in accordance with the changed density adjustment value.

2. The image forming apparatus according to claim 1, wherein the basic change amount is an amount by which the density adjustment value is changed to restrict a deviation between a target density of the first image and an actual density of the first image that is formed in the corresponding image formed region with the density adjusted in accordance with the current density adjustment value by executing first the image formation processing by the single unit since the density adjustment condition is satisfied.

3. The image forming apparatus according to claim 1, wherein the fine change amount is an amount by which the density adjustment value is changed by the amount smaller than the basic change amount to restrict a deviation between a target density of the single image and an actual density of the single image that is formed in the corresponding image formed region by the image forming unit with the density adjusted in accordance with the current density adjustment value.

4. The image forming apparatus according to claim 1, wherein if the density adjustment condition is satisfied while the image formation processing by the single unit is executed, the controller provides control in which the density adjustment value is changed by the basic change amount after the currently executed image formation processing by the single unit is completed.

5. The image forming apparatus according to claim 1, wherein the fine change amount is assigned to a density corresponding to an actually measured density of a reference image, wherein the image forming apparatus further comprises a measurement unit that measures a density of the reference image formed in the image formed region, and wherein the controller provides control in which, if a single image other than the first image is formed in the corresponding image formed region, the current density adjustment value is changed by the fine change amount assigned to a density that involves an error of the density measured by the measurement unit, and the single image is formed in the corresponding image formed region by the image forming unit with a density that is adjusted in accordance with the changed density adjustment value.

6. The image forming apparatus according to claim 1, further comprising:

a reception unit that receives a density adjustment instruction for adjusting a density of an image, wherein the controller provides control in which, if the reception unit receives the density adjustment instruction, an image is formed in the corresponding image formed region with a density that is obtained by predetermined adjustment made on the density adjustment value in response to the density adjustment instruction received by the reception unit.

7. The image forming apparatus according to claim 6, wherein the controller further provides control in which, if the reception unit receives the density adjustment instruction, an image is formed in the corresponding image formed region with a density that is obtained by predetermined adjustment made on the density adjusted in accordance with the density adjustment value changed by the fine change amount, in response to the density adjustment instruction received by the reception unit.

8. The image forming apparatus according to claim 1, further comprising:

a reception unit that receives a density adjustment instruction for adjusting a density of an image, wherein the controller provides control in which, if the reception unit receives the density adjustment instruction, an image is formed in the corresponding image formed region with a density that is obtained by predetermined adjustment made on the density adjusted in accordance with the density adjustment value changed by the fine change amount, in response to the density adjustment instruction received by the reception unit.

9. The image forming apparatus according to claim 1, wherein the image forming unit includes an image holding body, an electrostatic latent image being formed on the image holding body when a surface of the image holding body is exposed to light, the image holding body holding the electrostatic latent image, the surface of the image holding body being electrically charged by a charging unit, and a development unit that applies a developer to a region containing the electrostatic latent image held by the image holding body and hence develops the electrostatic latent image, and wherein the controller further provides control in which a density of an image formed by executing the image formation processing is adjusted within a range that a ratio of an absolute value of a difference between a potential with which the image holding body is electrically charged by the charging unit and a development bias potential used when the electrostatic latent image is developed by the development unit, to an absolute value of a difference between the development bias potential and a potential of the region exposed to the light on the surface electrically charged by the charging unit is held.

10. An image forming apparatus, comprising:

an image forming unit that respectively forms a plurality of images in a plurality of corresponding image formed regions by executing image formation processing by a single unit, with a density that is adjusted in accordance with a predetermined density adjustment value that is predetermined for each of different density adjustment methods; and a controller that provides control in which, if the image formation processing by the single unit is executed first since a density adjustment condition for adjusting a density of an image is satisfied, the corresponding density adjustment value is changed by a predetermined basic change amount predetermined for each of the density adjustment methods, and a first image is formed in the corresponding image formed region by the image forming unit with a density that is adjusted in accordance with the changed density adjustment value, and control in which, if a single image other than the first image is formed in the corresponding image formed region, the current corresponding density adjustment value is changed by a predetermined fine change amount that is smaller than the corresponding basic change amount and predetermined for each of the density adjustment methods, and the single image is formed in the corresponding image formed region by the image forming unit with a density that is adjusted in accordance with the changed density adjustment value.

11. The image forming apparatus according to claim 10, wherein the basic change amount is an amount by which the density adjustment value is changed for each of the density adjustment methods to restrict a deviation between a target density of the first image and an actual density of the first image that is formed in the corresponding image formed region with the density adjusted in accordance with the current density adjustment value by executing first the image formation processing by the single unit since the density adjustment condition is satisfied.

12. The image forming apparatus according to claim 10, wherein the fine change amount is an amount by which the density adjustment value is changed for each of the density adjustment methods by the amount smaller than the basic change amount to restrict a deviation between a target density of the single image and an actual density of the single image that is formed in the corresponding image formed region by the image forming unit with the density adjusted in accordance with the current density adjustment value.

13. The image forming apparatus according to claim 10, wherein if the density adjustment condition is satisfied while the image formation processing by the single unit is executed, the controller provides, for each of the density adjustment methods, control in which the density adjustment value is changed by the basic change amount after the currently executed image formation processing by the single unit is completed.

14. The image forming apparatus according to claim 10, wherein the fine change amount is assigned to a density corresponding to an actually measured density of a reference image, for each of the density adjustment methods, wherein the image forming apparatus further comprises a measurement unit that measures a density of the reference image formed in the image formed region, and wherein the controller provides, for each of the density adjustment methods, control in which, if a single image other than the first image is formed in the corresponding image formed region, the current density adjustment value is changed by the fine change amount assigned to a density that involves an error of the density measured by the measurement unit, and the single image is formed in the corresponding image formed region by the image forming unit with a density that is adjusted in accordance with the changed density adjustment value.

15. The image forming apparatus according to claim 10, further comprising:

a reception unit that receives a density adjustment instruction for adjusting a density of an image, wherein the controller provides, for each of the density adjustment methods, control in which, if the reception unit receives the density adjustment instruction, an image is formed in the corresponding image formed region with a density that is obtained by predetermined adjustment made on the density adjustment value in response to the density adjustment instruction received by the reception unit.

16. The image forming apparatus according to claim 15, wherein the controller further provides, for each of the density adjustment methods, control in which, if the reception unit receives the density adjustment instruction, an image is formed in the corresponding image formed region with a density that is obtained by predetermined adjustment made on the density adjusted in accordance with the density adjustment value changed by the fine change amount, in response to the density adjustment instruction received by the reception unit.

17. The image forming apparatus according to claim 10, further comprising:

a reception unit that receives a density adjustment instruction for adjusting a density of an image, wherein the controller provides, for each of the density adjustment methods, control in which, if the reception unit receives the density adjustment instruction, an image is formed in the corresponding image formed region with a density that is obtained by predetermined adjustment made on the density adjusted in accordance with the density adjustment value changed by the fine change amount, in response to the density adjustment instruction received by the reception unit.

18. A non-transitory computer readable medium storing a program causing a computer to execute a process for forming a plurality of images in a plurality of corresponding image formed regions by executing image formation processing by a single unit, with a density that is adjusted in accordance with a predetermined density adjustment value, the process comprising:

providing control in which, if the image formation processing by the single unit is executed first since a density adjustment condition for adjusting a density of an image is satisfied, the density adjustment value is changed by a predetermined basic change amount, and a first image is formed in the corresponding image formed region with a density that is adjusted in accordance with the changed density adjustment value; and providing control in which, if a single image other than the first image is formed in the corresponding image formed region, the current density adjustment value is changed by a predetermined fine change amount that is smaller than the basic change amount, and the single image is formed in the corresponding image formed region with a density that is adjusted in accordance with the changed density adjustment value.

19. A non-transitory computer readable medium storing a program causing a computer to execute a process for forming a plurality of images in a plurality of corresponding image formed regions by executing image formation processing by a single unit, with a density that is adjusted in accordance with a predetermined density adjustment value that is predetermined for each of different density adjustment methods, the process comprising:

providing control in which, if the image formation processing by the single unit is executed first since a density adjustment condition for adjusting a density of an image is satisfied, the corresponding density adjustment value is changed by a predetermined basic change amount predetermined for each of the density adjustment methods, and a first image is formed in the corresponding image formed region with a density that is adjusted in accordance with the changed density adjustment value; and providing control in which, if a single image other than the first image is formed in the corresponding image formed region, the current corresponding density adjustment value is changed by a predetermined fine change amount that is smaller than the corresponding basic change amount and predetermined for each of the density adjustment methods, and the single image is formed in the corresponding image formed region with a density that is adjusted in accordance with the changed density adjustment value.

20. An image forming method of forming a plurality of images in a plurality of corresponding image formed regions by executing image formation processing by a single unit, with a density that is adjusted in accordance with a predetermined density adjustment value, the method comprising:

providing control in which, if the image formation processing by the single unit is executed first since a density adjustment condition for adjusting a density of an image is satisfied, the density adjustment value is changed by a predetermined basic change amount, and a first image is formed in the corresponding image formed region with a density that is adjusted in accordance with the changed density adjustment value; and providing control in which, if a single image other than the first image is formed in the corresponding image formed region, the current density adjustment value is changed by a predetermined fine change amount that is smaller than the basic change amount, and the single image is formed in the corresponding image formed region with a density that is adjusted in accordance with the changed density adjustment value.

* * * * *